US010708208B2

(12) United States Patent
Wilde et al.

(10) Patent No.: US 10,708,208 B2
(45) Date of Patent: Jul. 7, 2020

(54) SMART CHUNKING LOGIC FOR CHAT PERSISTENCE

(71) Applicant: Microsoft Technology Licensing, LLC, Redmond, WA (US)

(72) Inventors: Benjamin G. Wilde, Quincy, MA (US); Douglas L. Milvaney, Cambridge, MA (US); Nikhil Nathwani, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 15/184,389

(22) Filed: Jun. 16, 2016

(65) Prior Publication Data

US 2017/0366493 A1    Dec. 21, 2017

(51) Int. Cl.
*H04L 12/58* (2006.01)
*G06Q 10/10* (2012.01)

(52) U.S. Cl.
CPC ........... *H04L 51/16* (2013.01); *G06Q 10/101* (2013.01); *H04L 51/04* (2013.01)

(58) Field of Classification Search
CPC ......... H04L 51/16; H04L 51/04; H04L 51/00; H04L 51/22; G06Q 10/10; G06Q 10/107; G06F 2217/04; G06F 3/0484; G06F 17/50; G06F 17/5018; G11B 27/034; G11B 27/322; H04N 21/4788; H04N 21/6125; H04N 21/854; H04N 7/173
See application file for complete search history.

(56) References Cited

U.S. PATENT DOCUMENTS 7,218,943 B2 *   5/2007   Klassen .................. H04L 51/16
                                                     455/412.1
7,568,007 B2 *   7/2009   Narayanaswami .. G06Q 10/107
                                                     709/205

(Continued)

FOREIGN PATENT DOCUMENTS

WO        2008137457 A1    11/2008

OTHER PUBLICATIONS

Frem, Peter, "Comments and Revisions in Word 2013", Retrieved From <<https://blogs.office.com/en-us/2012/08/28/comments-and-revisions-in-word-2013/?eu=true>>, Aug. 28, 2012, 8 Pages.

(Continued)

*Primary Examiner* — Chris Parry
*Assistant Examiner* — Abderrahmen Chouat (57) ABSTRACT

Aspects of the present disclosure relate to systems and methods for providing distinct conversations within a file activity feed for display on a user interface of a client computing device. A file created with an application may be rendered on the user interface. The file may include at least a chat pane comprising a plurality of chat messages and a file activity feed including one or more activities associated with the file. It may be determined when a distinct conversation begins and ends within the chat pane. The distinct conversation may include at least some of the plurality of chat messages. In response to determining when the distinct conversation begins and ends, the distinct conversation may be recorded as a distinct conversation activity associated with the file. The distinct conversation activity may be displayed within the file activity feed.

19 Claims, 6 Drawing Sheets

(56) References Cited

U.S. PATENT DOCUMENTS

| | | | |
|---|---|---|---|
| 8,364,514 | B2 | 1/2013 | Macbeth et al. |
| 8,412,815 | B2 | 4/2013 | Brownholtz et al. |
| 9,395,892 | B1* | 7/2016 | Beausoleil .......... G06F 3/04842 |
| 9,577,966 | B1* | 2/2017 | Dorsey ................ H04L 51/066 |
| 2006/0183100 | A1 | 8/2006 | Voehl et al. |
| 2009/0112935 | A1 | 4/2009 | Hefta-Gaub |
| 2012/0259675 | A1 | 10/2012 | Roehrs et al. |
| 2013/0218987 | A1 | 8/2013 | Chudge et al. |
| 2014/0025756 | A1* | 1/2014 | Kamens ............... H04L 51/066 709/206 |
| 2014/0298207 | A1 | 10/2014 | Ittah et al. |
| 2014/0379439 | A1 | 12/2014 | Sekhar |
| 2015/0281148 | A1 | 10/2015 | Masterson et al. |
| 2015/0288775 | A1* | 10/2015 | Larabie-Belanger ....................... H04L 67/24 715/203 |
| 2016/0254942 | A1* | 9/2016 | de Luna ............. G06F 9/44584 709/212 |
| 2016/0364368 | A1* | 12/2016 | Chen ....................... H04L 51/04 |

OTHER PUBLICATIONS

"International Search Report and Written Opinion Issued in PCT Application No. PCT/US2017/036658", dated Sep. 13, 2017, 13 Pages.

Xhafa, et al., "A Grid-Based Approach for Processing Group Activity Log Files", In Proceedings of the International Workshops and Posters on the Move to Meaningful Internet Systems, Oct. 25, 2004, 12 pages.

"Zohu Docs", Published on: Dec. 2, 2015 Available at: https://www.zoho.com/docs/features.html#collaborative-work.

Gunn, Ian, "A new activity stream in Drive shows you what's changed", Published on: Jan. 14, 2014 Available at: http://googleforwork.blogspot.in/2014/01/a-new-activity-stream-in-drive-shows.html.

"Merging and managing comments", Retrieved on: Mar. 14, 2016 Available at: https://www.adobe.com/content/dam/Adobe/en/feature-details/acrobatpro/pdfs/merging-and-managing-comments.pdf.

"Activity stream Design Pattern", Published on: Jun. 11, 2010 Available at: http://ui-patterns.com/patterns/ActivityStream.

Bouamrane, et al., "Supporting Remote Collaboration through Structured Activity Logging", In Proceedings of Grid and Cooperative Computing, Nov. 30, 2005, pp. 1096-1107.

"Group Communication & Collaboration Spaces in Moodle", Published on: Sep. 7, 2015 Available at: https://www.it.umass.edu/support/moodle/group-communication-collaboration-spaces-moodle.

Juan, et al., "Developing an Information System for Monitoring Student's Activity in Online Collaborative Learning", In Proceedings of the International Conference on Complex, Intelligent and Software Intensive Systems, Mar. 4, 2008, pp. 270-275.

Quemada, et al., "A Collaborative Environment Integration Layer for Activity Orientation", In Proceedings of International Conference on Collaborative Computing: Networking, Applications and Worksharing, Nov. 17, 2006, 5 pages.

* cited by examiner

SMART CHUNKING LOGIC FOR CHAT PERSISTENCE

BACKGROUND

Current applications for processing information such as word processing applications, spreadsheet applications, and electronic slide presentation applications, may facilitate co-authoring and collaborating among users of the applications. One scenario for facilitating collaborating among users of the applications includes live chatting within the applications. While current applications may facilitate in-app live chatting, the chat history disappears or individual single messages may be interleaved with other document activities. In this regard, collaborators of the application either have no record of the conversation that they can go back and review or may have a difficult time parsing and/or finding individual single messages and/or sets of messages including conversations interleaved with other document activities. In turn, current techniques for facilitating in-app live chatting for collaborating among users of an application are inefficient and inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for providing distinct conversations within a file activity feed for display on a user interface of a client computing device. A file created with an application may be rendered on the user interface. The file may include at least a chat pane comprising a plurality of chat messages and a file activity feed including one or more activities associated with the file. It may be determined when a distinct conversation begins and ends within the chat pane. The distinct conversation may include at least some of the plurality of chat messages. In response to determining when the distinct conversation begins and ends, the distinct conversation may be recorded as a distinct conversation activity associated with the file. The distinct conversation activity may be displayed within the file activity feed.

In other aspects, rendering of a file created with an application on a user interface may be initiated. The user interface may include a chat pane comprising a plurality of chat messages. At least some of the plurality of chat messages may be grouped into a distinct conversation. The distinct conversation may be recorded as a distinct conversation activity associated with the file. A file activity feed including one or more activities associated with the file may be rendered in the user interface. The one or more activities may include at least the distinct conversation activity.

In another aspect, a collaboration application may include a file in a user interface for collaborating among a plurality of collaborators of the file. The collaboration application may further include a chat pane within the file in the user interface through which to receive a plurality of chat messages for communicating among the plurality of collaborators in real-time. The collaboration application may further include a file activity feed through which to, in response to grouping at least some of the plurality of chat messages into a distinct conversation, display the distinct conversation as a distinct conversation activity within the file activity feed.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Aspects of the disclosure are generally directed to providing distinct conversations within a file activity feed. For example, distinct conversations that include a plurality of chat messages may be included in files created with information processing applications such as word processing applications, spreadsheet applications, and electronic slide applications. In this regard, users and/or co-authors of the files created with the information processing applications may clearly and easily identify and review specific conversation moments that occurred while collaborating in the information processing applications. In one example, the plurality of chat messages may be grouped into a distinct conversation by determining when the distinct conversation begins and ends within a chat pane. In one case, determining when the distinct conversation begins and ends within the chat pane is based on chunking logic. The distinct conversation may be displayed as an activity within the file activity feed. For example, a file activity feed may be displayed within a file and include one or more activities associated with the file. In this regard, a user of the file may quickly identify the distinct conversation activity within the file activity feed. When a user wants to review the distinct conversation (e.g., the chat messages that occurred in the conversation), a user may select the distinct conversation activity within the file activity feed. In response to receiving a selection of the distinct conversation activity, the plurality of chat messages that were grouped into the selected distinct conversation activity may be displayed in navigable conversation window.

As discussed above, one scenario for facilitating collaborating among users of the applications includes live chatting within the applications. While current applications may facilitate in-app live chatting, the chat history disappears or individual single messages may be interleaved with other document activities. In this regard, collaborators of the application either have no record of the conversation that they can go back and review or may have a difficult time parsing and/or finding individual single messages and/or sets of messages including conversations interleaved with other document activities. In turn, current techniques for facilitating in-app live chatting for collaborating among users of an application are inefficient and inadequate.

Accordingly, aspects described herein include providing distinct conversations within a file activity feed for display on a user interface of a client computing device. In one example, rendering of a file created with an application on a user interface may be initiated. The file may include a chat pane comprising a plurality of chat messages. For example, the chat messages may include messages from two or more collaborators of the file. At least some of the plurality of messages may be grouped into a distinct conversation. In one example, the plurality of messages may be grouped into the distinct conversation by determining when the distinct conversation begins and ends. For example, chunking logic may be applied to the plurality of messages in the chat pane to determine which messages of the plurality of messages to group into the distinct conversation. In some examples, the distinct conversation may be recorded as a distinct conversation activity associated with the file. In some cases, a file activity feed including one or more activities associated with the file may be rendered within the file. The one or more activities may include at least the distinct conversation activity. In this regard, users/co-authors may quickly, easily, and efficiently identify the distinct conversation activity within the file activity feed. As such, a technical effect that may be appreciated is that displaying the distinct conversation activity within the file activity feed facilitates a compelling visual and functional experience to allow a user to efficiently interact with a user interface for collaborating on documents. In turn, collaboration on documents may be accomplished in a faster and/or more efficient manner, ultimately reducing processor load, conserving memory, and reducing network bandwidth usage.

In other aspects, a collaboration application may include a file in a user interface for collaborating among a plurality of collaborators of the file. The collaboration application may further include a chat pane within the file in the user interface through which to receive a plurality of chat messages for communicating among the plurality of collaborators in real-time. The collaboration application may further include a file activity feed through which to, in response to grouping at least some of the plurality of chat messages into a distinct conversation, display the distinct conversation as a distinct conversation activity within the file activity feed. In some examples, the collaboration application further includes a navigable conversation window through which to, in response to receiving an indication of interest made with respect to the distinct conversation activity, display the grouped chat messages of the distinct conversation activity. Accordingly, another technical effect that may be appreciated is that the chat messages of a chat conversation are organized and displayed as a distinct conversation activity within the file activity feed in a clear, understandable, and functional surface so that a user may quickly and efficiently identify the distinct conversation activity and review the chat messages within the distinct conversation activity.

Figure 1:
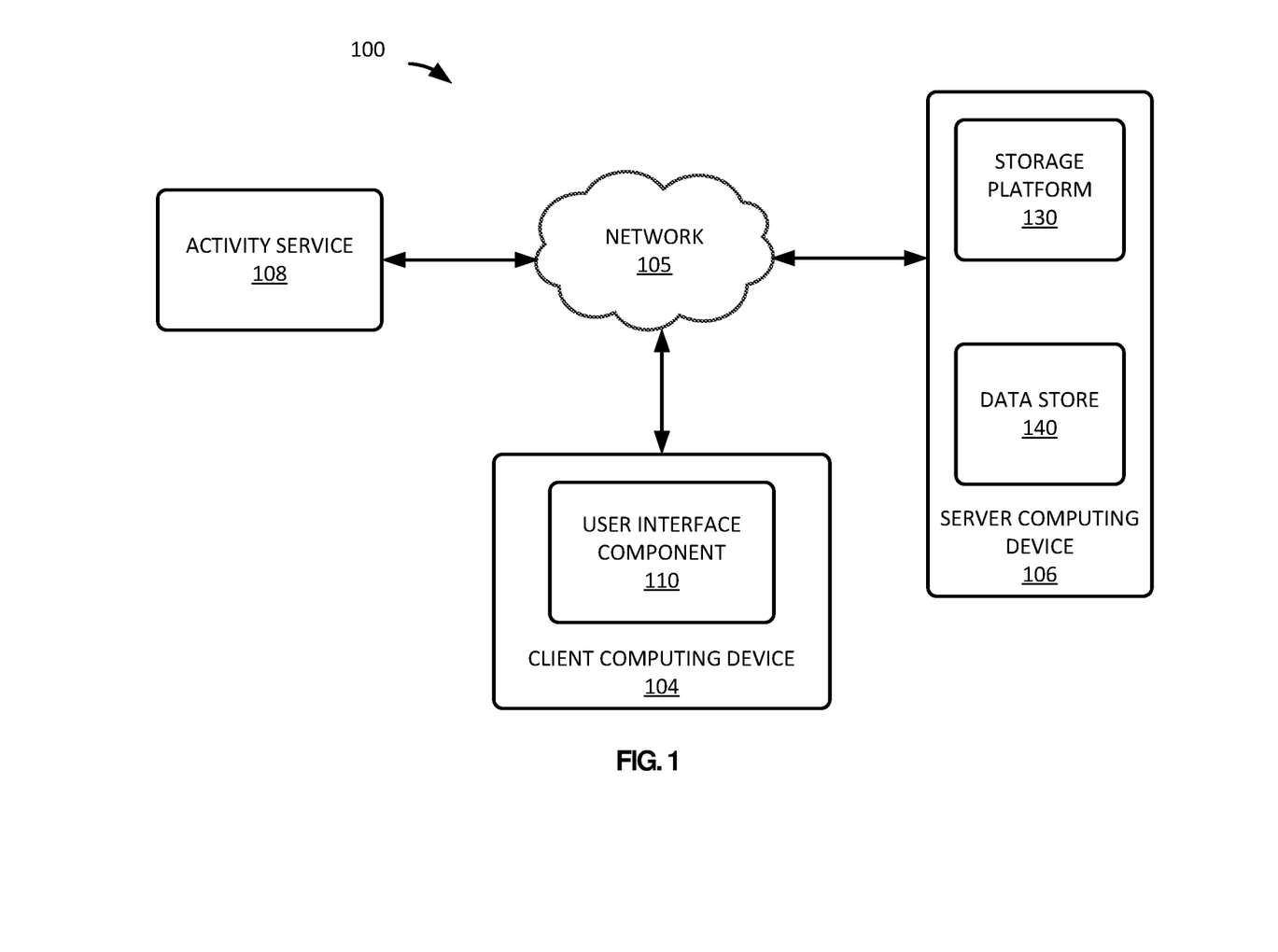
FIG. 1 illustrates an exemplary collaboration system for providing distinct conversations within a file activity feed, according to an example aspect.

Referring now to the drawings, in which like numerals represent like elements through the several figures, aspects of the present disclosure and the exemplary operating environment will be described. With reference to FIG. 1, one aspect of a collaboration system 100 for providing distinct conversations within a file activity feed is illustrated. The collaboration system 100 may include a client computing device 104, a server computing device 106, and an activity service 108. In aspects, the collaboration system 100 may be implemented on the client computing device 104. In a basic configuration, the client computing device 104 is a handheld computer having both input elements and output elements. The client computing device 104 may be any suitable computing device for implementing the collaboration system 100 for providing distinct conversations within a file activity feed. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the collaboration system 100 for providing distinct conversations within a file activity feed may be utilized.

In aspects, the collaboration system 100 may be implemented on the server computing device 106. The server computing device 106 may provide data to and from the client computing device 104 through a network 105. In aspects, the collaboration system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the collaboration system 100 may include the client computing device 104, the server computing device 106, and the activity service 108. The various components may be implemented using hardware, software, or a combination of hardware and software. In aspects, the client computing device 104 may include a user interface component 110. The user interface component 110 may be configured to display a distinct conversation activity within a file activity feed. In response to receiving a selection of the distinct conversation activity, the user interface component 110 may display a navigable conversation window including a plurality of chat messages of the distinct conversation activity. For example, the user interface component 110 may initiate rendering of a file created with an application on a user interface of the client computing device 104. In one example, an application may include any application suitable for collaboration and/or co-authoring such as a word processing application, spreadsheet application, electronic slide presentation application, email application, chat application, voice application, and the like. In one case, a file associated with and/or created with the application may include a word document, a spreadsheet, an electronic slide presentation, an email, a chat conversation, and the like. As such, an exemplary application may be a word processing application. In this example, an exemplary file associated with the word processing application may include a word document. In one example, an information processing application may include a word processing application, a spreadsheet application, and an electronic slide presentation.

In one example, the file rendered on the user interface may include a chat pane. The chat pane may facilitate communicating with collaborators of the file in real-time. For example, the chat pane may include Instant Messaging technology. In this regard, the chat pane may include a plurality of chat messages. The plurality of chat messages may include messages from collaborators of the file. For example, collaborators of the file may have a conversation relative to the file while making edits, for example, by sending messages using the chat pane. In some cases, at a later time, the collaborators of the file may want to review a conversation moment that occurred using the chat pane. In this regard, the user interface component 110 and/or the file rendered on the user interface may group at least some of the plurality of chat messages into a distinct conversation. The distinct conversation may be a conversation that occurs via the chat pane and includes a plurality of chat messages. In some examples, the distinct conversation may be a conversation that occurs via a chat pane of any collaboration application.

In some cases, the distinct conversation begins with a first chat message and ends with a last chat message. In this regard, grouping at least some of the plurality of chat messages into a distinct conversation may include determining when the distinct conversation begins and ends within the chat pane (e.g., which chat message is the first chat message in the distinct conversation and which chat message is the last chat message in the distinct conversation). In one example, determining when the distinct conversation begins and ends within the chat pane is based on chunking logic. The chunking logic may include a plurality of scenarios for determining when the distinct conversation begins and ends within the chat pane. In a first example, the chunking logic may determine that the distinct conversation begins when a first chat message is sent from a first collaborator to a second collaborator and ends when a time period of silence associated with the chat pane is identified. For example, the first chat message that is sent between at least two collaborators of the file during a chat session may be the first chat message in the distinct conversation. When a specific time period has elapsed without any activity within the chat pane, the last chat message entered and/or sent via the chat pane may be the last chat message in the distinct conversation and when the distinct conversation ends. In one example, the time period of silence may be thirty minutes. In another example, the time period of silence may be one hour. In yet another example, the time period of silence may be two hours. It is appreciated that any time period of silence may be used and/or identified to determine when the distinct conversation ends. In one example, when the time period of silence is thirty minutes, the plurality of chat messages that are grouped into the distinct conversation may include the first chat message sent via the chat pane and the chat messages exchanged via the chat pane until thirty minutes of silence associated with the chat pane is identified (e.g., when thirty minutes has elapsed without any activity within the chat pane). While determining when the distinct conversation begins and ends based on chunking logic is discussed in the context of the chat pane described herein, it is appreciated that the distinct conversation may include any conversation that occurs using any application for collaborating.

In another example, the chunking logic may determine that the distinct conversation begins when at least two collaborators of the file send a chat message and ends when fewer than two collaborators of the file are active in the chat pane. For example, when a chat message sent by a first collaborator is identified and a first chat message sent by a second collaborator is identified, the chat message sent by the first collaborator and the first chat message sent by the second collaborator may be the first chat messages in the distinct conversation. At the time when fewer than two collaborators of the file are active in the chat pane (e.g., when only one collaborator or no collaborators are active in the chat pane), the last chat message entered and/or sent via the chat pane may be the last chat message in the distinct conversation and when the distinct conversation ends. In one example, the plurality of chat messages that are grouped into the distinct conversation may include the first chat messages sent via the chat pane by at least two collaborators and the chat messages exchanged via the chat pane until fewer than two collaborators of the file are active in the chat pane.

In another example, the chunking logic may determine that the distinct conversation begins when a first chat message is sent from a first collaborator to a second collaborator and ends when a specific number of chat messages are sent using the chat pane. For example, the first chat message that is sent between at least two collaborators of the file during a chat session may be the first chat message in the distinct conversation. The last chat message entered and/or sent via the chat pane when a specific number of chat messages have been sent using the chat pane may be the last chat message in the distinct conversation and when the distinct conversation ends. In one example, the specific number of chat messages may be fifty chat messages. In another example, the specific number of chat messages may be eighty chat messages. In yet another example, the specific number of chat messages may be twenty chat messages. It is appreciated that any specific number of chat messages may be sent and/or identified to determine when the distinct conversation ends. In one example, when the specific number of chat messages is fifty chat messages, the plurality of chat messages that are grouped into the distinct conversation may include the first chat message sent via the chat pane and the chat messages exchanged via the chat pane until fifty chat messages are sent using the chat pane.

In another example, the chunking logic may determine that the distinct conversation begins when a first chat message is sent from a first collaborator to a second collaborator and ends when a selection of a save conversation button is received. For example, the first chat message that is sent between at least two collaborators of the file during a chat session may be the first chat message in the distinct conversation. The last chat message entered and/or sent via the chat pane when a selection of a save conversation button is received may be the last chat message in the distinct conversation and when the distinct conversation ends. In one example, a save conversation button may be located within the chat pane. In this regard, in response to receiving a selection of the save conversation button, it may be determined that the distinct conversation has ended (e.g., the last chat message entered and/or sent via the chat pane is the last message of the distinct conversation). In one example, the plurality of chat messages that are grouped into the distinct conversation may include the first chat message sent via the chat pane and the chat messages exchanged via the chat pane until a selection of the save conversation button is received.

In another example, the chunking logic may determine that the distinct conversation begins when a first chat message is sent from a first collaborator to a second collaborator and ends when an amount of time has elapsed since the first chat message is sent from the first collaborator to the second collaborator. For example, the first chat message that is sent between at least two collaborators of the file during a chat session may be the first chat message in the distinct conversation. When amount of time has elapsed since the first chat message is sent from the first collaborator to the second collaborator, the last chat message entered and/or sent via the chat pane may be the last chat message in the distinct conversation and when the distinct conversation ends. In one example, the amount of time that has elapsed since the first chat message is sent from the first collaborator to the second collaborator may be 24 hours. In another example, the amount of time that has elapsed since the first chat message is sent from the first collaborator to the second collaborator may be 48 hours. In yet another example, the amount of time that has elapsed since the first chat message is sent from the first collaborator to the second collaborator may be 60 hours. It is appreciated that any amount of time that has elapsed since the first chat message is sent from the first collaborator to the second collaborator may be used to determine when the distinct conversation ends. In one example, when the amount of time that has elapsed since the first chat message is sent from the first collaborator to the second collaborator is 24 hours, the plurality of chat messages that are grouped into the distinct conversation may include the first chat message sent via the chat pane and the chat messages exchanged via the chat pane for 24 hours after the first chat message is sent.

In another example, the chunking logic may determine that the distinct conversation begins at a time of a first edit made to the file and ends at a time of a last edit made to the file. In one example, a file history may be reviewed over a period of time to find when the earliest file edits occurred and when the latest file edits occurred within the period of time reviewed. For example, the file history may be reviewed over a period of a week and the earliest file edits and the latest file edits that occurred in the week reviewed may be identified. In this regard, the first chat message identified at the time of the first edit made to the file may be the first chat message in the distinct conversation. The last chat message identified at the time of the last edit made to the file may be the last chat message in the distinct conversation and when the distinct conversation ends. In one example, the plurality of chat messages that are grouped into the distinct conversation may include the first chat message identified at the time of the first edit made to the file and the chat messages exchanged via the chat pane until the last chat message that is identified at the time of the last edit made to the file.

In another example, the chunking logic may determine that the distinct conversation begins when a first chat message is sent from a first collaborator to a second collaborator and ends at a particular time corresponding to a time zone associated with a geographical location of a collaborator. For example, the first chat message that is sent between at least two collaborators of the file during a chat session may be the first chat message in the distinct conversation. The last chat message entered and/or sent via the chat pane at a particular time corresponding to a time zone associated with a geographical location of a collaborator may be the last chat message in the distinct conversation and when the distinct conversation ends. In one example, the time zone associated with the geographical location of a collaborator may be a time zone associated with a collaborator located the furthest East of the co-collaborators of the file. For example, if a file has two collaborators, where the first collaborator lives on the West Coast of the United States and the second collaborator lives on the East Coast of the United States, the time zone associated with a geographical location of a collaborator is the East Coast time zone. In this example, the particular time corresponding to the East Coast time zone may be any East Coast time (e.g., 6 pm Eastern time). In one example, when the particular time is 6 pm and the time zone is Eastern time, the plurality of chat messages that are grouped into the distinct conversation may include the first chat message sent via the chat pane and the chat messages exchanged via the chat pane until 6 pm Eastern time. While a specific example is described herein, it is appreciated that any particular time and/or time zone may be used to determine when a distinct conversation begins and ends.

In another example, the chunking logic may determine that the distinct conversation begins when a first chat message is sent from a first collaborator to a second collaborator and ends when an additional collaborator enters or exits a chat session. For example, the first chat message that is sent between at least two collaborators of the file during a chat session may be the first chat message in the distinct conversation. In one example, when three collaborators are participating in a chat session and a fourth collaborator enters the chat session, the last message sent between the three collaborators may be the last chat message in the distinct conversation and when the distinct conversation ends. In this regard, the plurality of chat messages that are grouped into the distinct conversation may include the first chat message sent via the chat pane and the chat messages exchanged between the three collaborators. A new conversation may begin when the fourth collaborator enters the chat session. In another example, when three collaborators are participating in a chat session and one of the three collaborators exits the chat session, the last message sent between the three collaborators may be the last chat message in the distinct conversation and when the distinct conversation ends.

In aspects, the distinct conversation may be recorded as a distinct conversation activity associated with the file. For example, when it is determined when the distinct conversation begins and ends within the chat pane, the plurality of messages included in the distinct conversation may be recorded as a distinct conversation activity. In one example, the distinct conversation activity may be sent to the activity service 108. In one case, the distinct conversation activity may be stored at the activity service 108. In another case, the distinct conversation activity may be stored locally on the client computing device 104.

In aspects, the user interface component 110 may render, within the file, a file activity feed including one or more activities associated with the file. In one example, the one or more activities include at least the distinct conversation activity. In some cases, collaborators of the file may have viewing permissions associated with the distinct conversation activity. The viewing permissions may allow a collaborator of the file to see the distinct conversation activity displayed within the file activity feed. For example, the collaborators of the file who have at least one chat message in the distinct conversation activity may have viewing permissions. In this regard, the distinct conversation activity is only displayed within the file activity feed for the collaborators of the file who participated in the conversation associated with the distinct conversation activity (e.g., the collaborators who sent at least one chat message that is included in the distinct conversation activity). In another example, collaborators of the file who are present and/or active in the file may have viewing permissions. In this regard, the distinct conversation activity may be displayed within the file activity feed for the collaborators of the file who are present and/or active in the file during a conversation. In another example, collaborators of the file who have access to the file may have viewing permissions. As discussed above, the distinct conversation activity may include a plurality of chat messages that have been grouped together based on chunking logic. In this regard, in response to receiving an indication of interest made with respect to the distinct conversation activity, the grouped chat messages of the distinct conversation activity may be displayed within a navigable conversation window. In one example, an indication of interest may include touching, clicking on, audibly referencing, pointing to, selecting, and/or any indication of an interest in or selection of the distinct conversation activity. As such, a collaborator may quickly and easily identify the distinct conversation activity within the file activity feed and review the conversation (e.g., the chat messages) associated with the distinct conversation activity.

In some examples, in addition to the distinct conversation activity, the one or more activities displayed within the file activity feed may include content changes, communication activities, document content exchanges, permission requests, sharing, printing, and the like. In one example, the one or more activities may include messages, communication activities, comments, email activities, presentation of the file, printing the file, co-authoring the file, and the like. In one case, email activities may include sending an email, printing an email, and the like. In another example, the one or more activities may include receiving a shared file, renaming a file, sharing a file, editing a file, restoring a file, and the like.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

As discussed above, the distinct conversation activity may be sent to and stored at the activity service 108. In this regard, the client computing device 104 and/or the user interface component 110 may obtain one or more activities (e.g., including the distinct conversation activity) from one or more sources. For example, the client computing device 104 and/or the user interface component 110 may obtain the one or more activities from the server computing device 106. The server computing device 106 may include a storage platform 130 and the data store 140. In this regard, the client computing device 104 and/or the user interface component 110 may obtain the one or more activities from at least the storage platform 130 and the data store 140. In one example, the storage platform 130 may be configured to store, manage, and access data and/or information associated with the collaboration system 100. For example, the storage platform 130 may store one or more files and/or one or more activities associated with a file in a data store 140. In another example, the data store 140 may include attribution information. In one case, attribution information may include information regarding the user/author performing an activity and/or a recipient of the plurality of activities. In one example, data store 140 may be part of and/or located at the storage platform 130. In another example, data store 140 may be a separate component and/or may be located separate from the storage platform 130. It is appreciated that although one server computing device 106 is illustrated in FIG. 1, the collaboration system 100 may include a plurality of server computing devices 106 with a plurality of storage platforms 130 and a plurality of data stores 140. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

In another case, the client computing device 104 and/or the user interface component 110 may obtain the one or more activities from the activity service 108. The activity service 108 may be configured to receive, store, create, generate, update, manage, and access one or more activities and/or information associated with the collaboration system 100. For example, the activity service 108 may receive, store, create, generate, update, and manage one or more activities associated with a file and/or activity metadata corresponding to the one or more activities associated with the file. In another example, the activity service 108 may provide access to the one or more activities associated with a file and/or activity metadata corresponding to the one or more activities associated with the file. In one case, the client computing device 104, the server computing device 106, and/or an application associated with the client computing device 104 and/or the server computing device 106 may access the activity service 108.

In aspects, the storage platform 130 may communicate with the client computing device 104 and/or the activity service 108. In this regard, the storage platform 130 may retrieve and/or obtain one or more activities associated with one or more files from the activity service 108. In one case, the storage platform 130 may retrieve and/or obtain activity metadata corresponding to the one or more activities from the activity service 108. In another case, the storage platform 130 may send activity metadata corresponding to one or more activities associated with one or more files to the activity service 108 for storage.

Figure 2:
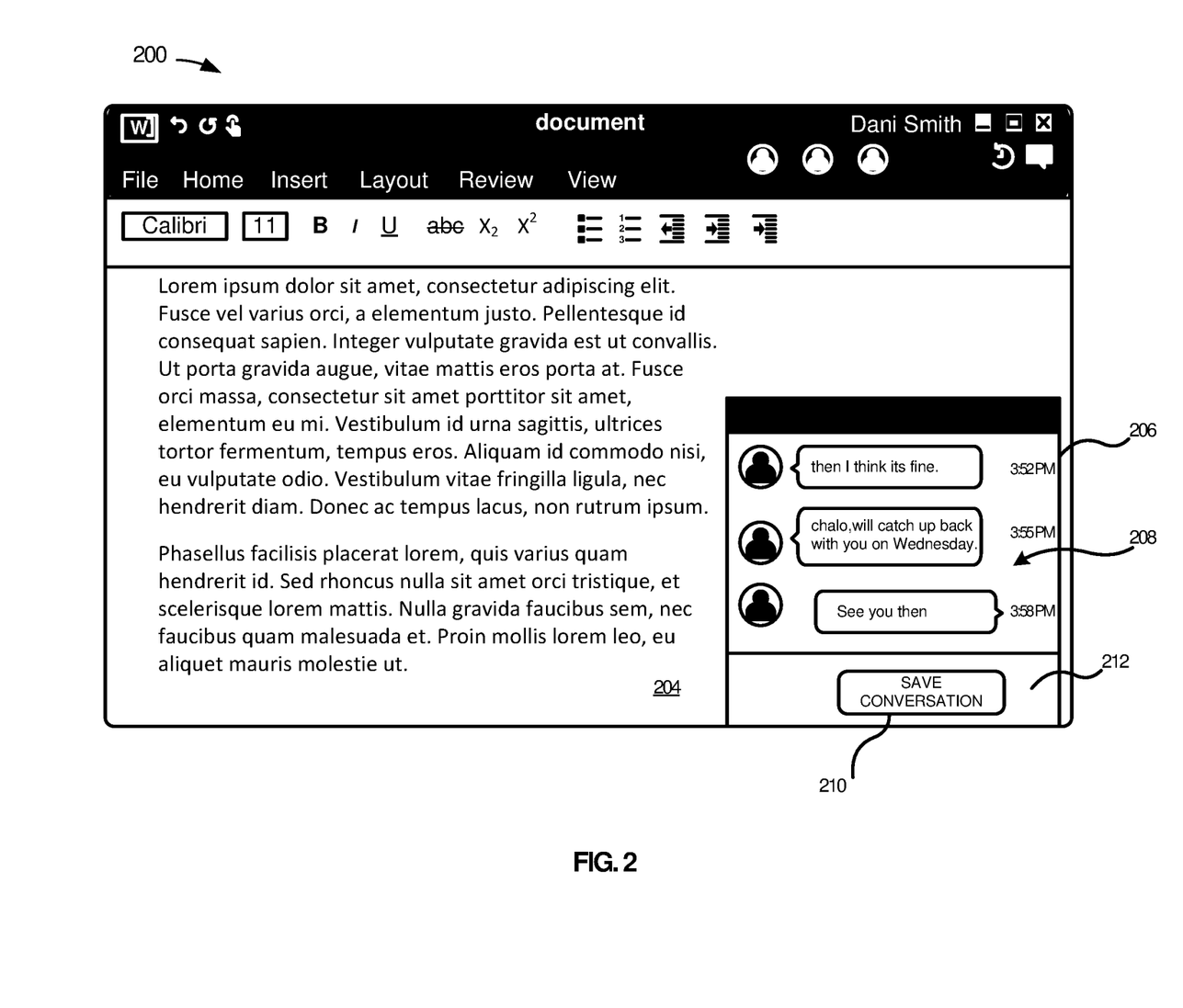
FIG. 2 illustrates one view of a word processing application displayed on a user interface of a client computing device, according to an example aspect.

Referring now to FIG. 2, one view 200 of a word processing application displayed on a user interface of the client computing device 104, such as a desktop computer, tablet computer or a mobile phone, for example, is shown. The exemplary application, as shown in FIG. 2, is a word processing application. In one example, an application may include any information processing application suitable for collaboration and/or co-authoring such as a word processing application, spreadsheet application, and electronic slide presentation application. In one case, a file associated with the application may include a word document, a spreadsheet, and/or an electronic slide presentation. As such, an exemplary application may be a word processing application, as illustrated in FIG. 2. In this example, an exemplary file associated with the word processing application may include a word document. As such, an exemplary file activity feed (e.g., the file activity feed associated with the word document) may include one or more activities associated with the word document. Additionally, the distinct conversation activity may include a plurality of chat messages associated with the word document.

As illustrated, the exemplary view 200 of the word processing application displayed on the client computing device 104 includes a file 204 and a chat pane 206. The chat pane 206 includes a plurality of chat messages 208, a text box 212, and a save conversation button 210. In some examples, a plurality of chat messages 208 may be received and sent via the chat pane 206 for communicating among a plurality of collaborators in real-time. In one example, the plurality of chat messages 208 include chat messages from at least two collaborators of the file. The chat pane 206 may facilitate communicating with collaborators of the file in real-time. For example, the chat pane 206 may include Instant Messaging technology. In this regard, the chat pane 206 includes the plurality of chat messages 208. The plurality of chat messages may include messages from collaborators of the file. For example, collaborators of the file may have a conversation relative to the file while making edits, for example, by sending messages using the chat pane. In some cases, at a later time, the collaborators of the file may want to review a conversation moment that occurred using the chat pane.

In some examples, the text box 212 may facilitate sending a chat message to another collaborator of the file. For example, a collaborator may enter (e.g., by typing) a chat message in the text box 212. In one example, the save conversation button 210 may facilitate grouping the plurality of chat messages 208 into a distinct conversation. For example, in response to receiving a selection of the save conversation button 210, it may be determined that the distinct conversation has ended (e.g., the last chat message entered and/or sent via the chat pane 206 is the last message of the distinct conversation). In the example illustrated in FIG. 2, the last chat message of the distinct conversation is "see you then". In this regard, the plurality of chat messages 208 may be grouped into a distinct conversation and recorded as a distinct conversation activity associated with the file 204.

Figure 3A:
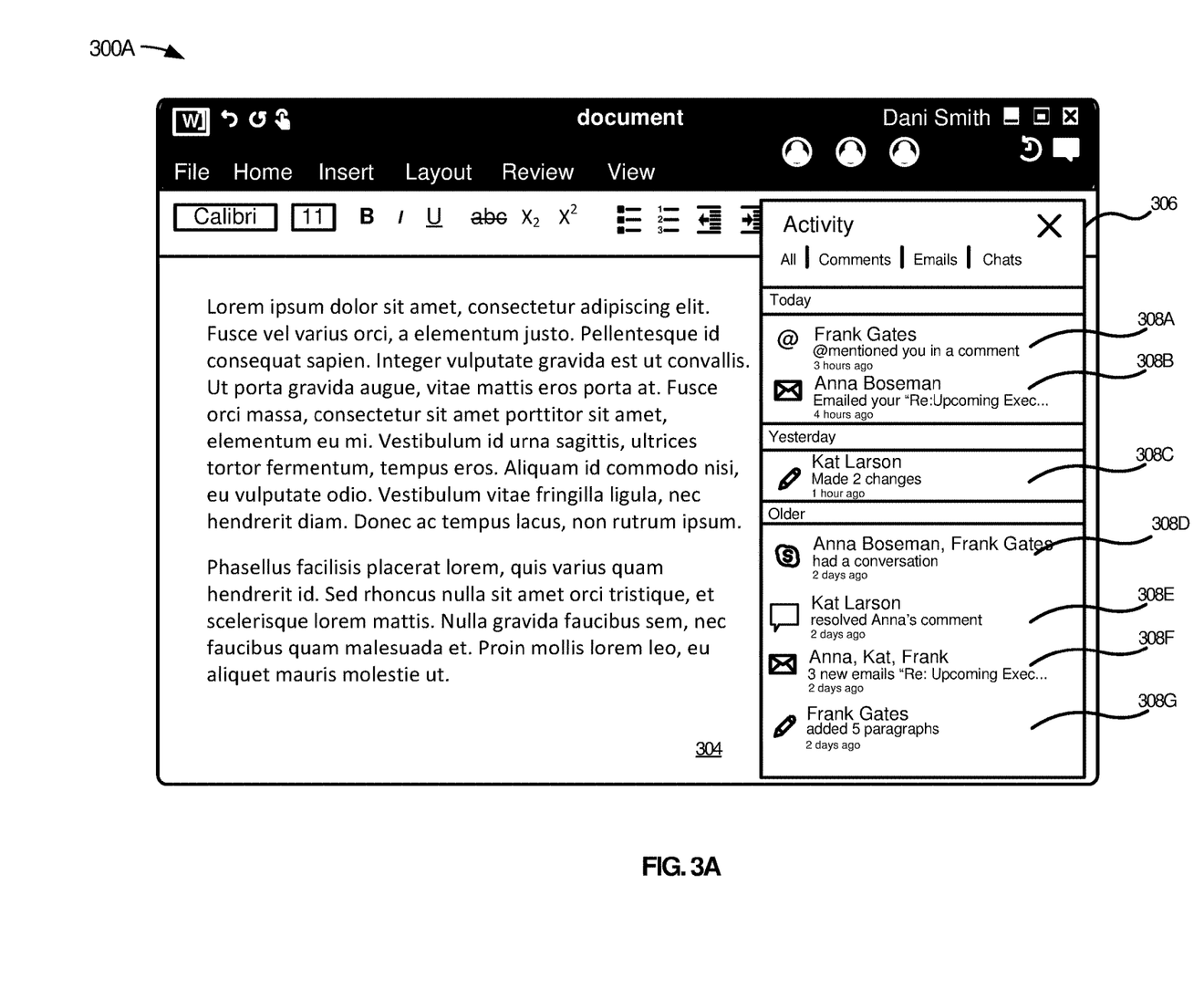
FIG. 3A illustrates one view in a progression of views of a word processing application, according to an example aspect.

Referring now to FIG. 3A, one view 300A in a progression of views of a word processing application displayed on a user interface of the client computing device 104, such as a desktop computer, tablet computer or a mobile phone, for example, is shown. As illustrated, the exemplary view 300A of the word processing application displayed on the client computing device 104 includes a file 304, a file activity feed 306, and a plurality of activities 308A-308G. The activities 308A-308G are exemplary activities of the file activity feed 306. It is appreciated that while FIG. 3A illustrates activities 308A-308G of the file activity feed 306, the discussion of activities 308A-308G and the file activity feed 306 is exemplary only and should not be considered as limiting. Any suitable number and/or type of activities of the file activity feed 306 may be displayed on the client computing device 104. Furthermore, while the present disclosure discusses the word processing application, file 304, and file activity feed 306, this is only exemplary and should not be considered limiting. Any number of applications, files, and/or file activity feeds may be utilized in conjunction with the present disclosure.

As illustrated in FIG. 3A, the file activity feed 306 includes a plurality of activities 308A-308G associated with the file 304. In one example, the file activity feed 306 is rendered and displayed next to a canvas of the file 304. In one case, the file activity feed 306 is rendered within the file 304 in response to receiving a selection of the file activity icon (not illustrated). Activities 308A and 308E are activities of the type "comments," activities 308B and 308F are activities of the type, "email," activities 308C and 308G are activities of the type "edit," and activity 308D is an activity of the type "distinct conversation". In the example illustrated in FIG. 3A, the distinct conversation activity 308D is a conversation that occurred between two collaborators (e.g., Anna Boseman and Frank Gates) of the file 304. In this regard, the distinct conversation activity 308D may include a plurality of chat messages (e.g., the plurality of chat messages 208) sent and received between Anna Boseman and Frank Gates. In response to receiving an indication of interest made with respect to the distinct conversation activity 308D, the plurality of chat messages of the distinct conversation activity 308D may be displayed within a navigable conversation window, which will be described relative to FIG. 3B. In one scenario, when there are additional co-collaborators of the file 304, the distinct conversation activity 308D is visible/viewable to/by only Anna Boseman and Frank Gates. In this regard, both Anna Boseman and Frank Gates have at least one chat message in the distinct conversation activity 308D and have viewing permissions associated with the distinct conversation activity 308D.

Figure 3B:
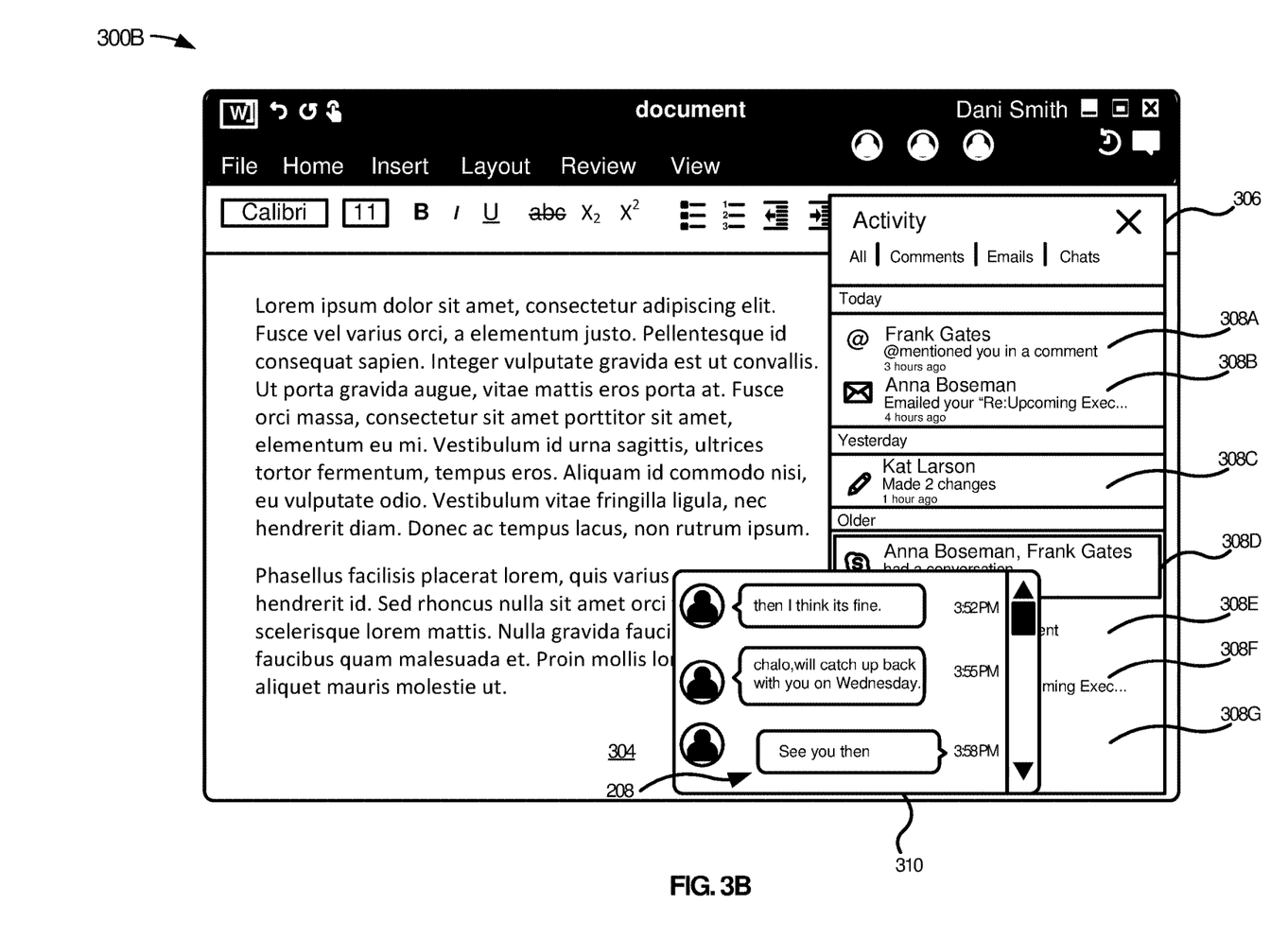
FIG. 3B illustrates another view in the progression of views of the word processing application of FIG. 3A, according to an example aspect.

Referring now to FIG. 3B, another view 300B in a progression of views of the word processing application displayed on a user interface of the client computing device 104, such as a desktop computer, tablet computer or a mobile phone, for example, is shown. As illustrated, the exemplary view 300B of the word processing application displayed on the client computing device 104 includes the file 304, the file activity feed 306, the plurality of activities 308A-308G, and a navigable conversation window 310. The plurality of activities 308A-308G described relative to FIG. 3B include the same and/or similar functionality as the plurality of activities 308A-308G described above relative to FIG. 3A. For example, one or more of the plurality of activities 308A-308G may include distinct conversation activities including a plurality of chat messages.

As shown in FIG. 3B, the distinct conversation activity 308D is selected. As such, in response to receiving a selection of the distinct conversation activity 308D, the navigable conversation window 310 may be displayed. The navigable conversation window 310 may include a plurality of chat messages of the distinct conversation activity 308D. In the example illustrated in FIG. 3B, the distinct conversation activity 308D includes the plurality of chat messages 208 illustrated in FIG. 2. In this regard, the two collaborators who participated in the conversation including the plurality of chat messages 208 may review the conversation that occurred at a previous time. In some cases, a collaborator may scroll through the plurality of chat messages 208 via the navigable conversation window 310. In this regard, users, co-authors, and/or collaborators of the file 304 may clearly and easily identify the distinct conversation activity 308D within the file activity feed 306 and review specific conversation moments that occurred while collaborating in the file 304 (e.g., the plurality of chat messages 208).

In aspects, the navigable conversation window 310 including the plurality of chat messages 208 may be rendered and/or displayed on the user interface. In some examples, navigable conversation window 310 including the plurality of chat messages 208 may be rendered and/or displayed within the file 304. In other examples, navigable conversation window 310 including the plurality of chat messages 208 may be rendered and/or displayed within the file 304 next to the file contents within the canvas. In one case, the navigable conversation window 310 including the plurality of chat messages 208 may be rendered and/or displayed over the file activity feed 306.

Figure 4:
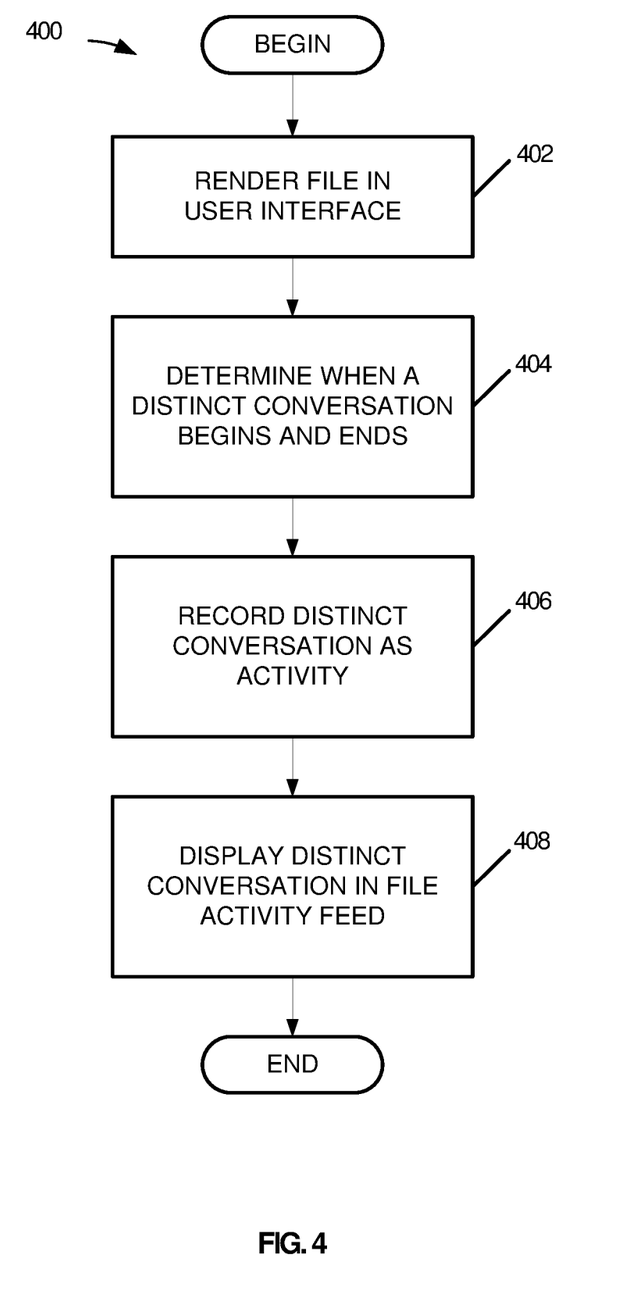
FIG. 4 illustrates an exemplary method for providing distinct conversations within a file activity feed for display on a user interface of a client computing device, according to an example aspect.

Referring now to FIG. 4, an exemplary method 400 for providing distinct conversations within a file activity feed for display on a user interface of a client computing device, according to an example aspect is shown. Method 400 may be implemented on a computing device or a similar electronic device capable of executing instructions through at least one processor. Distinct conversations may be provided and/or displayed within a file activity feed of any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for providing distinct conversations within a file activity feed for display on a user interface of a client computing device may be utilized by method 400, including combinations of the above-listed applications.

Method 400 may begin at operation 402, where a file created with an application may be rendered on a user interface. In one example, the file may be rendered on a client computing device. In one example, the file may include a chat pane comprising a plurality of chat messages. At least some of the plurality of messages may be grouped into a distinct conversation. In another example, the file may include a file activity feed including one or more activities associated with the file. In one example, the one or more activities associated with the file may include a distinct conversation activity. In one case, the chat pane and the file activity feed may be displayed and/or rendered within the file at the same time. In another case, the chat pane and the file activity feed may be displayed and/or rendered within the file at different times.

When the file created with an application is rendered on a user interface, flow proceeds to operation 404 where it is determined when a distinct conversation begins and ends within the chat pane. The distinct conversation may include at least some of the plurality of chat messages within the chat pane. In one example, it is determined when a distinct conversation begins and ends within the chat pane based on chunking logic. The chunking logic may include a plurality of scenarios/elements for determining when a distinct conversation begins and ends within the chat pane. The chunking logic may include any combination of the scenarios/elements described herein for determining when a distinct conversation begins and ends. For example, one combination of chunking logic may include determining that the distinct conversation begins when a first chat message is sent from a first collaborator to a second collaborator and ends when either a time period of silence associated with the chat pane is identified or fewer than two collaborators of the file are active in the chat pane. In another example, a combination of chunking logic may include determining that the distinct conversation begins at a particular time corresponding to a time zone associated with a geographical location of a collaborator and ends when an amount of time has elapsed since the particular time corresponding to a time zone associated with a geographical location of a collaborator. In another example, a combination of chunking logic may include determining that the distinct conversation begins at a time of a first edit made to the file and ends a selection of a save conversation button is received. It is appreciated that while example scenarios of chunking logic for determining when a distinct conversation begins and ends are described herein, the discussion of the scenarios of chunking logic for determining when a distinct conversation begins and ends is exemplary only and should not be considered as limiting. Any scenario/element of chunking logic may be used for determining when a distinct conversation begins and ends within the chat pane.

In response to determining when a distinct conversation begins and ends within the chat pane, flow proceeds to decision operation 406 where the distinct conversation is recorded as a distinct conversation activity associated with the file. For example, when it is determined when the distinct conversation begins and ends within the chat pane, the plurality of messages included in the distinct conversation may be recorded as a distinct conversation activity. In one example, the distinct conversation activity may be sent to the activity service. In one case, the distinct conversation activity may be stored at the activity service. In another case, the distinct conversation activity may be sent to the server computing device and/or data store. In another case, the distinct conversation activity may be stored locally on the client computing device.

When the distinct conversation is recorded as a distinct conversation activity associated with the file, flow proceeds to operation 408 where the distinct conversation activity is displayed within the file activity feed. In one case, when the file activity feed is currently displayed within the file, the distinct conversation activity may be displayed among one or more activities currently displayed within the file activity feed. In another case, when the file activity feed is not currently displayed within the file, the distinct conversation activity may be displayed within the file activity feed when the file activity feed is rendered and/or displayed within the file. In one example, in response to receiving an indication of interest made with respect to the distinct conversation activity, the grouped chat messages of the distinct conversation activity may be displayed. In one example, the distinct conversation activity may be displayed within the chat pane.

The term rendering as used herein generally refers to the various capabilities employed in various computing architectures to assemble information that can then be used by other capabilities to generate an image or images. Within the context of method 400, for example, rendering a file or a file activity feed, for example, generally refers to assembling the information or data used to generate an image or images that together result in the file activity feed. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the method 400, rendering a file and/or a file activity feed may refer to generating an image or images, from information assembled for that purpose, that together result in the file and/or file activity feed, which can then be displayed.

It may also be appreciated that rendering in some scenarios may refer to a combination of the aforementioned possibilities. For example, rendering in some scenarios may refer to both assembling the information used to generate an image or images for a file and/or file activity feed and then generating the image or images of the file and/or file activity feed. In addition, a wide variety of other steps, processes, and stages may occur within the context of presenting views of an application, all of which may be considered part of presenting a view. Thus, yet one other variation on method 400 includes, but is not limited to, presenting a file on a user interface, grouping chat messages into a distinct conversation, and presenting a file activity feed.

Figure 5:
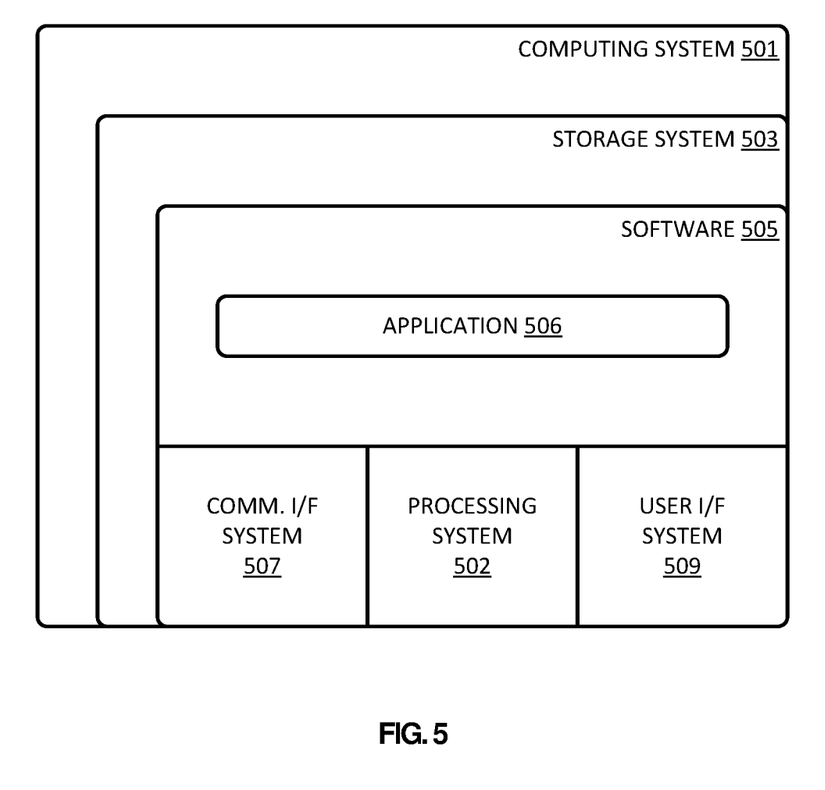
FIG. 5 illustrates a computing system suitable for implementing the enhanced collaboration technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including word processing applications described herein. When executed by processing system 502 to enhance collaboration systems, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced collaboration systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced collaboration systems. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Techniques for providing distinct conversations within a file activity feed are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of enhanced collaboration systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, mainframe computers, minicomputers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   a processor;
   one or more computer readable storage media; and
   program instructions stored on the one or more computer readable storage media that, when executed by the processor, cause the processor to at least:
   initiate rendering of a file created with an application in a user interface, the file including a plurality of chat messages that are renderable in a chat pane of the user interface;
   apply chunking logic including a first combination of elements to the plurality of chat messages to automatically determine boundaries of a first distinct conversation occurring within the chat pane including when the first distinct conversation begins and ends within the chat pane, wherein the first distinct conversation comprises a communication among a first plurality of collaborators;
   identify a first set of multiple chat messages of the plurality of chat messages within the chat pane that are included in the first conversation based on the boundaries of the first distinct conversation;
   group the first set of chat messages in association with the first distinct conversation;
   generate a first distinct conversation activity associated with the file from the first distinct conversation;
   apply chunking logic including a second combination of elements to the plurality of chat messages to automatically determine boundaries of a second distinct conversation occurring within the chat pane including when the second distinct conversation begins and ends within the chat pane, wherein the second distinct conversation comprises a communication among a second plurality of collaborators, and where at least one element of the first combination of elements is different from at least one element of the second combination of elements;
   identify a second set of multiple chat messages of the plurality of chat messages within the chat pane that are included in the second conversation based on the boundaries of the second distinct conversation;
   group the second set of chat messages in association with the second distinct conversation;
   generate a second distinct conversation activity associated with the file from the second distinct conversation; and
   generate, for rendering in the user interface, a file activity feed including one or more activities associated with the file, wherein the one or more activities include at least the first distinct conversation activity and the second distinct conversation activity.

2. The system of claim 1, wherein the first distinct conversation begins with a first chat message and ends with a last chat message.

3. The system of claim 1, wherein collaborators of the file have viewing permissions associated with the first distinct conversation activity, and wherein the viewing permissions allow a collaborator of the file to see the first distinct conversation activity displayed within the file activity feed.

4. The system of claim 3, wherein the collaborators of the file who have at least one chat message in the first distinct conversation activity have viewing permissions.

5. The system of claim 1, wherein to generate the first distinct conversation activity associated with the file, the program instructions, when executed by the at least one processor, cause the at least one processor to send the first distinct conversation activity to an activity service.

6. A computer-implemented method for providing distinct conversations within a file activity feed for display in a user interface of a client computing device, the method comprising:
   identifying a file created with an application on the user interface, wherein the file includes at least a chat pane comprising a plurality of chat messages and a file activity feed including one or more activities associated with the file;
   executing chunking logic including a first combination of elements for determining boundaries of a first distinct conversation including when a first distinct conversation begins and ends within the chat pane, wherein the first distinct conversation includes the plurality of chat messages;
   in response to determining when the first distinct conversation begins and ends, identifying a first set of multiple chat messages that are part of the first distinct conversation based on the boundaries of the first distinct conversation;
   storing the first set of multiple chat messages in association with the first distinct conversation;

recording the first distinct conversation as a first distinct conversation activity associated with the file;

executing chunking logic including a second combination of elements for determining boundaries of a second distinct conversation when a second distinct conversation begins and ends within the chat pane, wherein the second distinct conversation includes the plurality of chat messages;

in response to determining when the second distinct conversation begins and ends, identifying a second set of multiple chat messages that are part of the second distinct conversation based on the boundaries of the second distinct conversation;

storing the second set of multiple chat messages in association with the second distinct conversation;

recording the second distinct conversation as a second distinct conversation activity associated with the file;

updating a file activity feed to include the first distinct conversation activity and the second distinct conversation activity;

responsive to activation of the first distinct conversation, preparing the first distinct conversation for display in a navigable conversation window; and responsive to activation of the second distinct conversation, preparing the first distinct conversation for display in the navigable conversation window.

7. The computer-implemented method of claim 6, wherein the chunking logic includes determining that the first distinct conversation begins when a first chat message is sent from a first collaborator to a second collaborator and ends when a time period of silence associated with the chat pane is identified.

8. The computer-implemented method of claim 6, wherein the chunking logic includes determining that the first distinct conversation begins when at least two collaborators of the file send a chat message and ends when fewer than two collaborators of the file are active in the chat pane.

9. The computer-implemented method of claim 6, wherein the chunking logic includes determining that the first distinct conversation begins when a first chat message is sent from a first collaborator to a second collaborator and ends when a specific number of chat messages are sent using the chat pane.

10. The computer-implemented method of claim 6, wherein the chunking logic includes determining that the first distinct conversation begins when a first chat message is sent from a first collaborator to a second collaborator and ends when a selection of a save conversation button is received.

11. The computer-implemented method of claim 6, wherein the chunking logic includes determining that the first distinct conversation begins when a first chat message is sent from a first collaborator to a second collaborator and ends when an amount of time has elapsed since the first chat message is sent from the first collaborator to the second collaborator.

12. The computer-implemented method of claim 6, wherein the chunking logic includes determining that the first distinct conversation begins at a time of a first edit made to the file and ends at a time of a last edit made to the file.

13. The computer-implemented method of claim 6, wherein the chunking logic includes determining that the first distinct conversation begins when a first chat message is sent from a first collaborator to a second collaborator and ends at a particular time corresponding to a time zone associated with a geographical location of a collaborator.

14. A non-transitory computer readable storage media having program instructions stored thereon that, when executed by one or more processors, cause the one or more processors to at least:

initiate rendering of a file created with an application in a user interface, the file including a plurality of chat messages that are renderable in a chat pane of the user interface;

apply chunking logic including a first combination of elements to the plurality of chat messages to automatically determine boundaries of a first distinct conversation occurring within the chat pane including when the first distinct conversation begins and ends within the chat pane, wherein the first distinct conversation comprises a communication among a first plurality of collaborators;

identify a first set of multiple chat messages of the plurality of chat messages within the chat pane that are included in the first conversation based on the boundaries of the first distinct conversation;

group the first set of chat messages in association with the first distinct conversation;

generate a first distinct conversation activity associated with the file from the first distinct conversation;

apply chunking logic including a second combination of elements to the plurality of chat messages to automatically determine boundaries of a second distinct conversation occurring within the chat pane including when the second distinct conversation begins and ends within the chat pane, wherein the second distinct conversation comprises a communication among a second plurality of collaborators, and where at least one element of the first combination of elements is different from at least one element of the second combination of elements;

identify a second set of multiple chat messages of the plurality of chat messages within the chat pane that are included in the second conversation based on the boundaries of the second distinct conversation;

group the second set of chat messages in association with the second distinct conversation;

generate a second distinct conversation activity associated with the file from the second distinct conversation; and generate, for rendering in the user interface, a file activity feed including one or more activities associated with the file, wherein the one or more activities include at least the first distinct conversation activity and the second distinct conversation activity.

15. The non-transitory computer readable storage media of claim 14, wherein the first distinct conversation begins with a first chat message and ends with a last chat message.

16. The non-transitory computer readable storage media of claim 14, wherein collaborators of the file have viewing permissions associated with the first distinct conversation activity.

17. The non-transitory computer readable storage media of claim 16, wherein the viewing permissions allow a collaborator of the file to see the first distinct conversation activity displayed within the file activity feed.

18. The non-transitory computer readable storage media of claim 17, wherein the collaborators of the file who have at least one chat message in the first distinct conversation activity have viewing permissions.

19. The non-transitory computer readable storage media of claim 14, wherein to generate the first distinct conversation activity associated with the file, the program instructions, when executed by the one or more processors, cause the one or more processors to send the first distinct conversation activity to an activity service.

\* \* \* \* \*